United States Patent [19]
Pietrowicz

[11] Patent Number: 5,353,342
[45] Date of Patent: Oct. 4, 1994

[54] ADAPTIVE MULTITONE SIGNALING METHOD

[75] Inventor: Stanley Pietrowicz, Jersey City, N.J.

[73] Assignee: Bell Communications Research, Inc., Livingston, N.J.

[21] Appl. No.: 987,518

[22] Filed: Dec. 8, 1992

[51] Int. Cl.$^5$ ............................................. H04M 3/18
[52] U.S. Cl. ................................. 379/257; 379/361; 379/418
[58] Field of Search ......................... 379/257, 361, 418

[56] References Cited

U.S. PATENT DOCUMENTS

| | | | |
|---|---|---|---|
| 4,399,535 | 8/1983 | Southard | 379/257 |
| 4,962,527 | 10/1990 | Burns et al. | 379/418 |
| 5,263,084 | 11/1993 | Chaput et al. | 379/215 |

OTHER PUBLICATIONS

L. Gasser, et al., "Speech Immunity of Push-Button Tone Signaling Systems Employing Tone Receivers with Guard Circuits", Electrical Communication, vol. 39, No. 2, pp. 220–243, 1964.

Primary Examiner—James L. Dwyer
Assistant Examiner—Daniel S. Hunter
Attorney, Agent, or Firm—Leonard Charles Suchyta; James W. Falk

[57] ABSTRACT

An inband tone signaling method results in improvements in talk-off and talk-down performance without sacrificing important human factors considerations. The inband tone signal transmitter has a monitor (60) for monitoring the power level in one or more guard bands (1 and 2) of a voiceband signal. A tone generator (64) which is responsive to the monitor (60) generates the inband tone signal consisting of one or more signaling frequencies each at a level such that a desired signal-to-guard ratio is achieved at a detector (50).

10 Claims, 2 Drawing Sheets

ADAPTIVE MULTITONE SIGNALING METHOD

RELATED APPLICATION

An application entitled, "A Method and System For Detecting at a Selected Station an Alerting Signal in the Presence of Speech", contains subject matter related to the subject matter of the present application. The application has been filed for S. Pietrowicz, R. N. Battista, J. R. Bress and H. E. Mowalfy on even date herewith, bears Ser. No. 07/987,516, and is assigned to the assignee hereof. The contents of the related application are incorporated herein by reference.

FIELD OF THE INVENTION

The present invention relates to an inband tone signaling method. More particularly, the present invention relates to an adaptive inband tone signaling method that allows improvements in both talk-off and talk-down performance without sacrificing important human factors considerations.

BACKGROUND OF THE INVENTION

Inband tone signaling schemes using combinations of discrete frequencies have long been used in the telephone system. The primary advantage of inband tone signaling is that it shares the same spectrum that normally carries customer speech to transmit signal and control information. Sharing the voiceband is essential in situations where bandwidth is limited and dedicated control channels are either too costly or pose a degradation to service. Inband tone signaling is also well suited for short bursty types of signaling that do not occur often. One of the most common examples of inband tone signaling in the telephone system is touch tone dialing wherein inband tone signals are transmitted from a subscriber location to a central office. In other applications such as the Calling Identity Delivery on Call Waiting (CIDCW) and Analog Display Services Interface (ADSI Service), inband tone signals are transmitted from a transmitter at a central office to a detector at a subscriber location.

While reuse of the voiceband makes inband tone signaling seem like an attractive option, it also introduces significant problems related to signal recognition. Two traditional problems with inband tone signal detection are talk-off and talk-down. Talkoff occurs whenever a tone signal detector erroneously accepts signal imitations, such as those produced by speech and music, as valid tone signals. Numerous studies and experience have demonstrated that complex time varying signals such as speech and music can at times imitate some of the spectral and temporal characteristics of tone signals. These imitations are prone to triggering or talking off tone signal detectors. One of the challenges in designing tone signal detectors is making the detector resistant to signal imitations produced by speech and music, thereby mitigating the talk-off problem.

Another problem with inband tone signaling is that the tone signals must in some situations, compete with speech, music or other background noise on the line. The presence of these complex signals introduces extraneous spectral components that tend to distort and ultimately impair the detection of valid tone signals. A tone signal detector is said to have been talked down whenever it fails to recognize valid tone signals because they were masked by speech, music or noise.

Because both customer speech and tone signals share the same bandwidth and overlap in frequency, tone signal detectors for services such as CIDCW must, in the worst case, be able to simultaneously resist tone signal imitations produced by speech and music and recognize valid tone signals under very noisy circumstances.

Another constraint placed on tone signal recognition is the obvious relationship between talkoff and talkdown. In any given detector design, talkoff and talkdown are inverse. Good talkoff performance is usually achieved by sacrificing talkdown performance. Likewise, good talkdown performance is usually achieved by sacrificing talkoff performance.

It is a characteristic of tone signal detectors to employ the concept of guard action to reliably detect valid tone signals only when a certain signal-to-guard ratio is satisfied for each of the signaling frequency components in the tone signal. The signal-to-guard ratio is the ratio of the power present at a signaling frequency to the power of the voice signal in a designated guard band. The guard band is a portion of the voiceband that the detector uses to extract information about the purity of the signaling frequencies. The guard band can include the signaling spectrum. Each signaling frequency of the tone signal may have one or more guard bands. In some cases, all signaling frequencies in the tone signal may use a common guard band. If a detector requires a large positive signal-to-guard ratio, it will only validate incoming signals containing signaling frequencies that are relatively pure with respect to the guard bands. Requiring that a large signal-to-guard ratio be satisfied equates to reducing the set of possible speech and music imitations that will trigger the tone signal detector. One method of improving a detector's talkoff performance is to require that a large positive signal-to-guard ratio be satisfied for each signaling frequency before an incoming signal is recognized a valid tone signal.

Although good talkoff performance can be achieved by requiring a large positive signal-to-guard ratio, talkdown performance will most likely suffer. A valid tone signal superimposed on speech will be rejected by this detector because the signal-to-guard ratio requirement will not be satisfied. The ultimate outcome is that as tone signal detectors become more selective, they reject more signals as possible talk-offs and this in turn makes detector talk-down performance worse. From the perspective of a detector, talk-off and talk-down counterbalance one another. One cannot be made better without making the other worse.

Talk-off and talk-down performance are heavily influenced by the choice of signaling parameters employed. Generally, talk-off and talk-down are a function of:

Number of frequencies composing the tone signal
Choice of signaling frequencies
Temporal pattern of the tone signal
Amplitude of each signaling frequency
Detector's exposure time
Signal-to-voice ratio for each signaling frequency Values for each of these parameters are chosen to satisfy talk-off and talk-down performance criteria and also human factors considerations when customers can hear the tone signals. Based on the knowledge of typical spectral patterns of speech and music, some general recommendations can be made for each of these parameters to minimize talk-off and talk-down.

To minimize talk-off, the inband tone signal should be composed of no less than two frequency components. Studies see e.g., L. Glaser and E. Ganitta, "Speech Immunity of Push-Button Tone Signaling Systems Employ Tone Receivers with Guard Circuits," Electrical Communication, Volume 39, pages 20-243; 1964) have decisively shown that speech is less likely to imitate dual tone signals as opposed to single frequency signals. These frequencies should be chosen from the upper voiceband where the spectral power produced by speech is considerably less. The signal should be as long as possible in duration and may exhibit a pulsed temporal pattern. The tone detector should also only be exposed for the minimum necessary duration.

To minimize talk-down, the inband tone signal should contain the minimum number of frequencies required. These frequencies should also be chosen from the upper voiceband. The signal duration should be short and only single pulses should be used.

To minimize both talk-off and talk-down, the tone signal should be transmitted at the maximum allowable level.

From a human factors perspective, single frequency tone signals are preferred over multi-tone signals. Generally, the signaling frequencies should be chosen from the lower voiceband. The tone signal should be a single pulse of the minimum required duration and the amplitude of the tone signal should be sufficiently low so that it does not annoy the customer.

Table 1 below summarizes the results of the preceding discussion about choosing signaling parameters. Because some sort of balance must be reached to satisfy each of these opposing conditions, inband tone signaling parameters must be customized for the individual application.

TABLE 1

| Parameter | Talk-off | Talk-down | Customer Dissatisfaction |
| --- | --- | --- | --- |
| Frequency | Upper Voiceband and Multiple Frequencies | Upper Voiceband and Single Frequency | Lower Voiceband and Single Frequency |
| Amplitude | High Level | High Level | Low Level |
| Temporal Pattern | Long Pulse | Short Pulse | Short pulse |

One particular shortcoming of conventional inband tone signaling schemes is that tone signal levels are fixed. The same tone signal level is used for all kinds of line and subscriber loop conditions. In very noisy environments, tone signals are likely to be talked down if the tone signal level is too low. On the other hand, transmitted tone signal levels must be low enough so as not to annoy customers. While higher tone signal levels compensate for noisy conditions, long loops and loud talkers, they are unacceptable for soft talkers on short loops. Fixed level signal transmission is just too inflexible to handle the wide variety of line conditions. A more dynamic signaling scheme is needed.

In view of the foregoing, it is an object of the present invention to provide an inband tone signaling method which overcomes the shortcomings of the prior art inband tone signaling techniques. More particularly, it is an object of the present invention to provide an inband tone signaling method wherein the level of each signaling frequency in the tone signal is adjusted adaptively. This permits improvements in both talk-off and talk-down performance without sacrificing important human factors considerations.

SUMMARY OF THE INVENTION

In accordance with the present invention, an adaptive inband tone signaling method operates as follows. Before the transmitter sends an inband tone signal to the detector, it monitors the power in one or more guard bands of a voiceband signal. Based on this measurement, the transmitter adaptively selects an appropriate power level for each signaling frequency within the inband tone signal, so that when the tone signal appears at the detector, the signal-to-guard ratio for each signaling frequency is greater than a threshold signal-to-guard ratio required by the detector for reliable operation. For example, the power level of each signaling frequency of the inband tone signal may be set by the transmitter at a predetermined amount above the average signal level in the one or more guard bands.

In one embodiment of the invention, the transmitter continuously tracks changes in the power levels of the guard bands of the voiceband signal. If the guard band power levels suddenly increase, the power level of each signaling frequency would also increase. In an alternative embodiment, the power of each signaling frequency is adjusted at the start of the tone signal and remains constant throughout.

The inventive inband tone signaling method is superior to conventional inband tone signaling methods for the following reasons:

Improved talk-down performance
Allows talk-off performance to be improved without sacrificing talk-down performance
Sensitive to and compatible with human factors issues
Adaptive to various line and loop conditions
Provides good signaling performance under noisy conditions
Allows simple low cost detection circuitry to be used in customer premises equipment.

Conventional inband tone signaling methods can provide some of these desirable properties. However, the adaptive inband tone signaling method of the present invention stands apart from the conventional techniques because it simultaneously provides all of the advantages mentioned above. To implement the inventive inband tone signaling technique, a frequency sensitive monitor is used at the transmitter end. No change is required at the detector end.

In a typical application, a central office in a public switched telephone network monitors a voiceband signal which is being transmitted to and from a remote subscriber location. Specifically, a monitor in the central office monitors the power level in one or more guard bands of the voiceband signal. A tone generator in the central office is responsive to the power level in the guard bands. The tone generator adaptively generates the signaling frequencies of an inband tone signal with individual power levels such that when the inband tone signal is received at a detector at the subscriber location, the signal-to-guard ratio for each signaling frequency is equal to or exceeds a threshold above which tone signal detection is considered reliable.

DETAILED DESCRIPTION OF THE INVENTION

Figure 1:
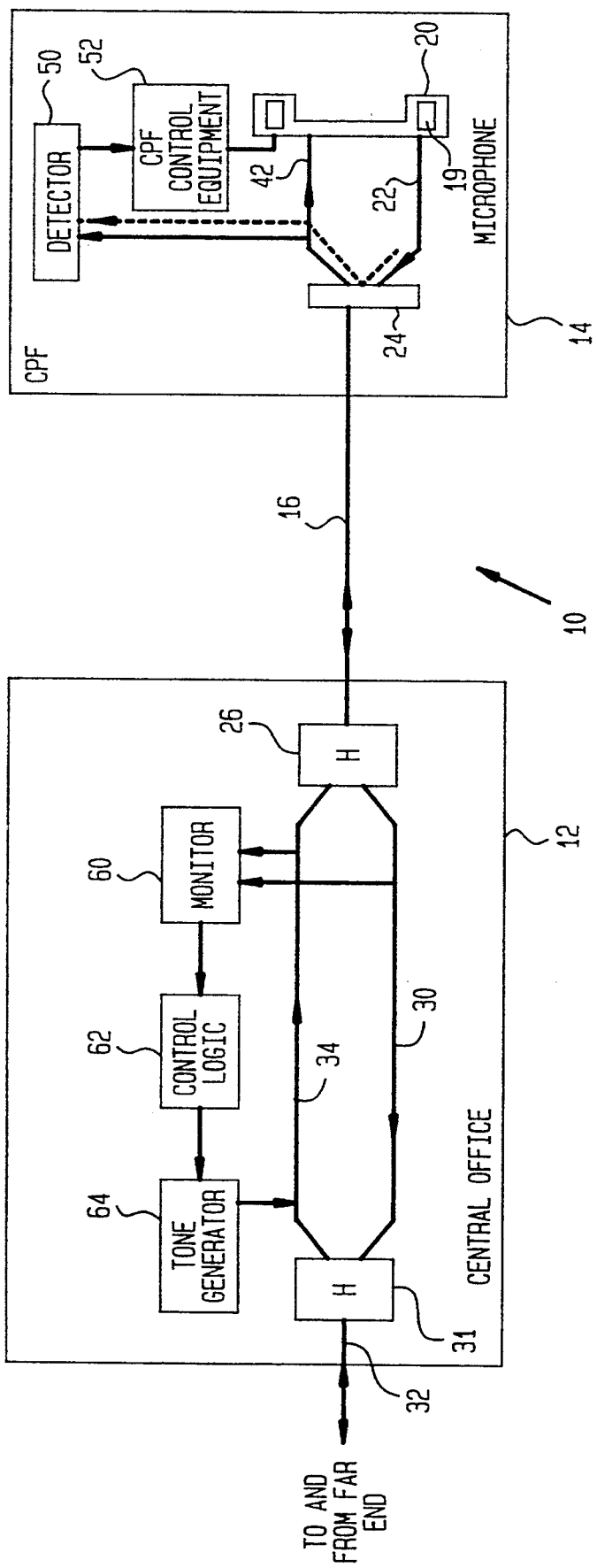
FIG. 1 schematically illustrates a central office switch and customer premises equipment which utilize the inventive inband tone signaling technique.

FIG. 1 shows a portion of a public switched telephone network 10. The network 10 includes a central office 12 and a unit of customer premises equipment (CPE) 14. The CPE 14 is connected to the central office 12 via the subscriber loop 16. The central office 12 is configured to use the adaptive inband tone signaling method of the present invention.

Consider the following example: A service subscriber is using the CPE 14 to have a conversation with a far-end party. The subscriber speaks into a microphone 19 contained within the handset 20. The resulting audio signals are transmitted to the central office 12 via the path 22, the near-end hybrid 24, the subscriber loop 16, and the central office hybrid 26. The audio signal propagates along a transmission path within the central office 12 schematically illustrated by the path 30 to another hybrid 31 and leaves the central office 12 on the line 32 for transmission to the far-end party. An audio signal from the far-end party is received at the central office 12 via line 32 and hybrid 31. The audio signal from the far-end propagates along a transmission path schematically illustrated by the path 34 in the central office 12. The hybrid 26 places the audio signal from the far-end party onto the subscriber loop 16 for transmission to the CPE 14. At the CPE 14, the hybrid 24 directs the audio signal from the far-end party onto the incoming transmission path 42. A speaker 43 in the handset 20 converts this audio signal into sound which can be heard by a user of the CPE 14.

The CPE 14 includes a detector 50 for detecting an inband tone signal. When the detector 50 detects an inband tone signal, a control signal on line 51 is issued by the detector 50. The control signal can cause a variety of actions in the CPE 14 some examples of which are described below. However, for purposes of illustration, the control signal on line 51 is shown as controlling CPE control equipment 52.

The detector 50 is illustratively a model MC145436 DTMF detector available from Motorola. The purpose of the detector is to receive inband tone signals from the central office switch. However, the detector is also exposed to the far-end audio signal propagating on path 42 and the near-end audio signal propagating on the path 22 via the hybrid 24 which reflects some of the signal propagating on path 22 back along path 42.

Figure 2:
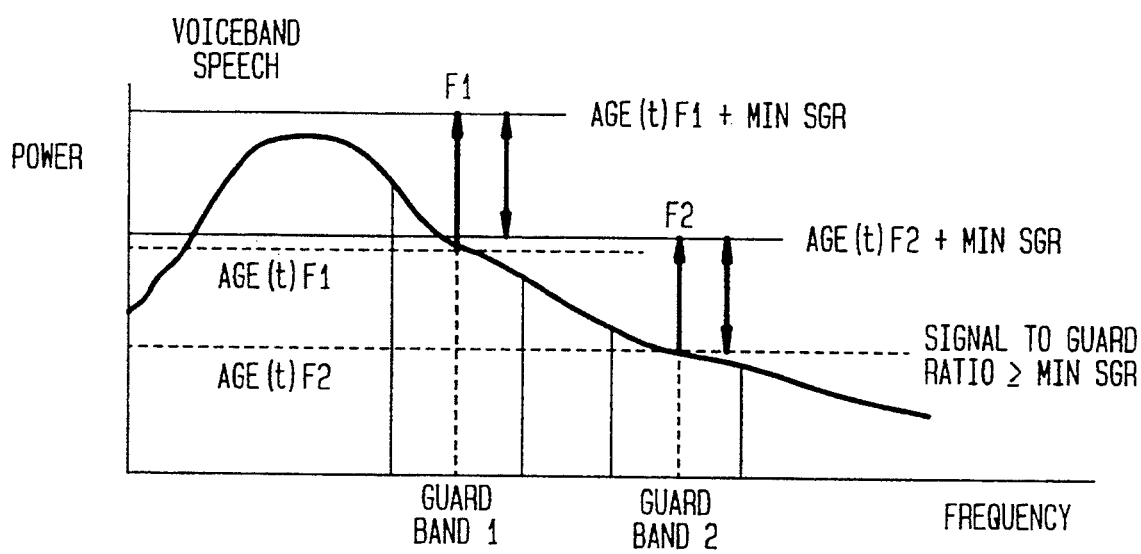
FIG. 2 plots power versus frequency for a voiceband signal at a detector in the customer premises equipment of FIG. 1.

FIG. 2 plots power versus frequency for the audio signal present at the detector 50. This audio signal is shown as having two guard bands, guard band 1 and guard band 2. The average guard power for each signaling frequency, AGE(t)F1 and AGE(t)F2, is also plotted in FIG. 2. The average guard power varies as a function of time. Consider inband tone signal at the frequency F1. This signaling frequency is detected by the detector 50 if its power level is such that the signal-to-guard ratio (i.e., the ratio of the inband tone signal power to average guard power) exceeds a threshold at the detector. Illustratively, the AGE(t)F1 is about −25 dB, AGE(t)F2 is about −35 dB, and the threshold signal-to-guard ratio is 10 dB. The guard band 1 occupies the frequency range of 1930–2330 Hz. The guard band 2 occupies the frequency range 2350–3050 Hz. The frequency F1 is about 2130 Hz.

Figure 3:
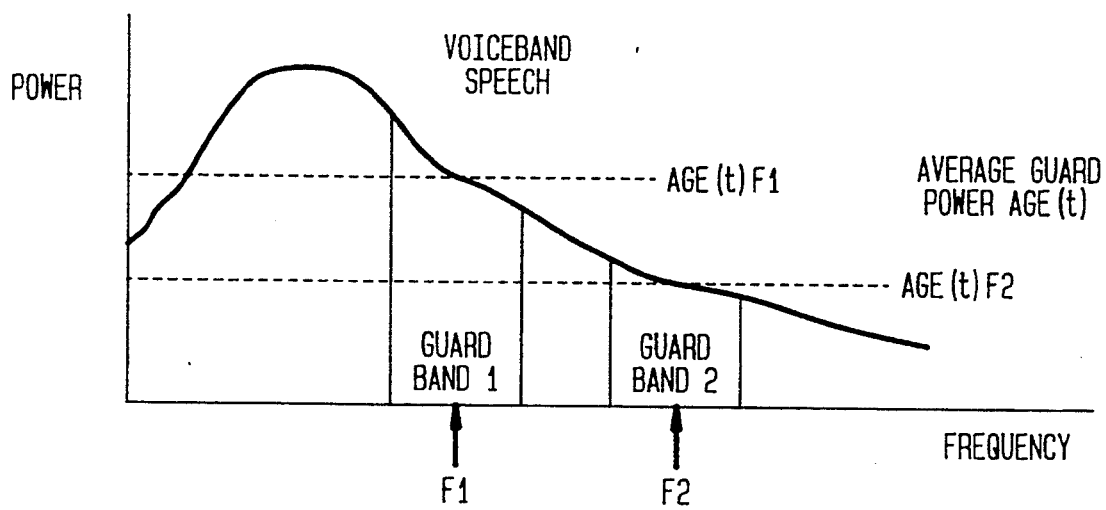
FIG. 3 plots power versus frequency for a voiceband signal as monitored at a transmitter in the central office of FIG. 1.

The inband tone signal is generated at the central office 12 in accordance with the present invention. To generate the inband tone signal, the central office includes the frequency sensitive power monitor 60, the control logic 62 and the tone signal generator 64. The monitor 60 monitors the near and far-end audio signals, traversing the paths 30 and 34 respectively. The audio signal as seen by the monitor 60 is illustrated in FIG. 3. Specifically, the monitor 60 monitors the power levels in the guard bands 1 and 2. These are the same guard bands which are shown in FIG. 2 and which are monitored by the detector 50 to detect an inband tone signal. The power levels in the guard bands are transmitted to the control logic 62. The control logic 62 in turn controls the tone signal generator 64. The control logic 64 causes the tone signal generator to generate an inband tone signal which is transmitted via path 34, path 16, and path 42 to the detector 50 at the CPE 14. Each frequency of the inband tone signal is generated by the tone signal generator 64 with a particular power level so that at the detector 50 in CPE 14 the threshold signal-to-guard ratio is exceeded for each signaling frequency.

There are several alternative algorithms that can be utilized to determine the power levels of the signaling frequencies comprising the inband tone signal generated by the tone signal generator 64. One algorithm involves calculating the averages guard power, AGE(t), for each of the signaling frequencies at the transmitter end and setting the power level of each signaling frequency a specified level above AGE(t) so that the threshold signal-to-guard ratio is exceeded for each signaling frequency at the detector 50. AGE(t) is calculated using the designated guard bands for each signaling frequency. If a signaling frequency has more than one guard band associated with it, the average power in each guard band at the transmitter can be determined separately and combined by means of a weighted sum. The power level of the signaling frequency can then be set a specified level above the weighted sum average. The power level of each signaling frequency will be a function of the average guard power, the estimated loop loss and the threshold signal-to-guard ratio needed by the detector.

In a preferred embodiment, the power of each signaling frequency generated by the inband tone signal generator 64 continuously tracks changes in the power levels of the guard bands. If the guard band power levels at the transmitter end suddenly increase, the power level of each signaling frequency would also increase. Effectively, the individual tone levels would float above the ambient noise in the guard bands by some specified signal-to-guard ratio. The tone levels would be continuously adjusted to maintain a constant signal-to-guard ratio.

However, if the assumption that speech power in the guard bands does not drastically change over the duration of the signal is valid, the tone levels can be adjusted at the start and held constant for the duration of the signal.

In the most general implementation, the frequency sensitive power monitor in the central office monitors the guard bands in both the near and far-end voice band signals. Monitoring both signals on paths 30 and 34 or the combined signal on path 16 is necessary when the tone signal will be superimposed onto the near end and far end voiceband signals. However, if it is permitted to mute the far end party while the tone signal is being sent to the near end, monitoring of only the near end voiceband signal on path 34 is necessary.

The control logic 62 that interprets the frequency sensitive power monitor output also contains logic that places an upper and lower bound on the individual tone levels. The control logic also implements one of the algorithms previously described, or a variation of it, to set the power levels of the individual tones.

One signaling application that the inventive inband tone signaling method is well suited for is the Calling Identity Delivery on Call Waiting (CIDCW) Class servicer. CIDCW provides a subscriber with caller identification information about a calling party whose call is waiting. The following sequence of events is the CIDCW service operation:

1. Assume that a CIDCW subscriber at the CPE 14 is currently engaged in a conversation with some far-end party.
2. Also assume that sometime during the duration of this call, a new call arrives at the central office 12 destined for this CIDCW subscriber. The switch 12 identifies that a third party is trying to reach the subscriber. It mutes the far-end party and generates a subscriber alerting signal (SAS) and CPE alerting signal (CAS) for the subscriber at the CPE 14. The SAS alerts the subscriber to the new call and the CAS wakes up the subscriber's CPE. The CPE then proceeds to mute the subscriber's handset and send back an acknowledgement signal to the switch 12. The CPE also places an FSK decoder on the line to receive CID information. (Illustratively, this is accomplished by the CPE control equipment 52 schematically illustrated in FIG. 1).
3. Upon receipt of the acknowledgement signal, the switch 12 sends the FSK data.
4. Once the CPE 14 has received the CID data or has timed out, the subscriber's voice path is returned to normal.

The signaling problems this service presents are exactly the problems of talk-off and talk-down. The tone signal detector 50 in the CPE 14 must continuously monitor the call for the wake-up signal. The detector 50 is exposed to customer speech from both the far-end as well as the near-end for the entire duration of the call. Since the detector is located in the subscriber's CPE, the speech level from the near-end talker can be up to 15 dB greater than talker levels measured at central office locations. Under these circumstances, talk-off is highly probable. The tone signal detector 50 used in the CPE must be highly resistant to speech and music. If the detector in the CPE is talked off, the subscriber's handset is muted and the conversation is unnecessarily disrupted.

Talk-down is also a prime consideration in implementing this service. Speech from the near-end talker can transverse the hybrid 24 in the CPE 14 and interfere with detection of the CAS. Since the detector 50 is located in the subscriber's CPE, near-end speech can significantly mask lower power, fixed amplitude CAS signals by creating negative signal-to-guard ratio conditions. Yet, the CAS must be transmitted at low power so that it does not annoy soft talkers on short loops. If the detector happens to miss this alerting signal, the subscriber fails to obtain the calling party's CID information.

The adaptive inband tone signaling method of the present invention is ideally suited to meet the inband tone signaling needs for this service because the tone signals are generated adaptively.

The adaptive inband tone signaling method of the present invention has a number of significant advantages.

The inventive adaptive signaling essentially lifts some of the burden of providing inband tone talk-down protection from the detector and places it on the transmitter. The transmitter is responsible for supplying at least the minimum required signal-to-guard ratio for each signaling frequency at the input to the detector. The transmitter has the capability to compensate for various environmental conditions such as loop loss.

With conventional inband tone signaling methods, talk-off and talk-down performance are inseparably related. Talk-off performance could not be improved without making talk-down performance worse. The inventive method differs from conventional inband tone signaling methods because it provides some degree of separation between the two. Because the burden of providing talk-down protection has shifted away from the detector, the invention allows more talk-off protection to be employed in the detector without sacrificing talk-down performance.

One way to improve talk-off performance is to increase the minimum required signal-to-guard ratio at the detector. In conventional inband tone signaling, this would present a problem since talk-down performance would suffer. However, the present invention enables adequate talk-down performance to be achieved since matching the transmitter and the detector are matched on the basis of the minimum requested signal-to-guard ratio.

One primary human factors concern for any signaling method in which the customer is exposed to signaling tones is the level of the tones presented to the customer. For signaling purposes, high level tones are favored. But customers prefer low level tones under normal circumstances. Superficially it may seem that this conflict cannot be resolved. However, the inventive inband tone signaling method satisfies both of these objectives.

The inventive method dynamically sets the tone signal levels for each talker. When the talker's power level in the guard bands is low, the tone signals are transmitted at low levels, but sufficiently above the guard energy by some specified signal-to-guard ratio. In this situation, the detector detects the signal and the customer is not annoyed with the tone levels. If the customer happens to be a loud talker, the amount of speech power in the guard bands will increase. In this case, the transmitter will sense the change and compensate by adjusting the tone levels. The tone levels only increase when the talker's speech power in the guard band increases.

Under these circumstances, the louder signal is not necessarily a problem. A loud talking customer has more sidetone routed back to his/her earpiece. This customer's hearing threshold slightly increases from that of the normal talker. The threshold at which this loud talker would consider the signal annoying is greater than that for the normal talker. In fact, the louder tone signals would actually help the loud talker recognize the signal without significantly causing any greater degree of annoyance than low level tones would for a normal talker.

Also, if the tone frequencies and the guard bands are in the upper voiceband, actual speech power in the 300 Hz–3.3 kHz band can be greater than the combined tone signal power in many situations. This result can be concluded from examining typical distribution of speech power which normally peaks between 300–800 Hz and rolls off sharply thereafter. Because the total speech signal power can at times be greater than the combined signaling tone power, signaling tones do not dominate the voiceband. This conclusion supports the hypothesis that louder talkers may not be annoyed by slightly louder signaling tones.

Overall, the inventive method is sensitive to customer dissatisfaction with high tone levels. As the inventive method dynamically sets the tone signal levels for each talker, it has the capability to adjust the tone levels to ensure detection without annoying the talker.

The only additional costs needed to implement the invention over conventional inband tone signaling is the cost of the frequency sensitive power monitor 60 and control logic 62 in the central office.

In short, an inventive inband tone signaling method has been disclosed. In accordance with the inventive method, at the transmitter end, the power in one or more guard bands of a voiceband signal is monitored and is used to adaptively choose the power levels of the signaling frequencies comprising the inband tone signal. The power level of each signaling frequency is chosen adaptively so that a desired signal-to-guard ratio is maintained at the detector end. The inventive method provides substantial gains in both talk-down and talk-off performance and is well suited for applications where inband tone signal detectors must be able to recognize valid inband tone signals under varying noisy conditions.

Finally, the above-described embodiments of the invention are intended to be illustrative only. Numerous alternative embodiments may be devised by those skilled in the art without departing from the scope of the following claims.

I claim:

1. An inband tone signaling method for use in a telephone network comprising the steps of
   at a transmitter, monitoring the power in one or more guard frequency bands comprising one or more portions of a voiceband signal,
   generating at said transmitter a tone signal comprising of one or more frequencies with individual power levels selected in response to the power in a selected one or more of said guard frequency bands, and
   transmitting the tone signal to a detector.

2. The method of claim 1 wherein said method comprises the step of continuously monitoring the power in said guard frequency bands and continuously adjusting the power of each signaling frequency of said tone signal in response thereto.

3. The method of claim 1 wherein the power of each signaling frequency of said tone signal is determined in response to the power in said selected one or more guard bands once at the start of said tone signal and wherein the power of each signaling frequency of said tone signal is maintained as constant for the duration of said tone signal.

4. The method of claim 1 wherein the power of each signaling frequency of said tone signal is chosen such that at said detector the tone signal-to-guard ratio is above a predetermined threshold.

5. The method of claim 1 wherein said transmitter is located in a central office of said telephone network.

6. The method of claim 5 wherein said detector is located at a unit of customer premises equipment in said telephone network.

7. An inband tone signaling method comprising the steps of
   receiving a voiceband signal at a central office switch of a telephone network,
   monitoring the power level in one or more guard bands of said voiceband signal,
   generating an inband tone signal whose tone power levels are dependent on the power level in a selected one or more of said guard bands,
   transmitting said inband tone signal from said central office switch to a unit of customer premises equipment, and
   detecting said inband tone signal at a detector located at said customer premises equipment.

8. A transmitter for use in a telephone network for generating an inband tone signal comprising
   a frequency selective signal power monitor for monitoring the power in one or more guard bands of a voiceband signal, and
   a tone signal generator for generating said inband tone signal with each individual tone power level determined in response to the power in a corresponding said one or more of said guard bands.

9. The method of claim 8 wherein said inband tone signal has individual tone power levels which are a predetermined amount above the average power level in said corresponding one or more guard bands.

10. The transmitter of claim 9 wherein said transmitter forms part of a central office switch.

* * * * *